(12) United States Patent
Brawer et al.

(10) Patent No.: US 9,373,191 B2
(45) Date of Patent: Jun. 21, 2016

(54) GENERATING AN EXTERIOR GEOMETRY OF A BUILDING BASED ON A CORRESPONDING COLLECTION OF INTERIOR GEOMETRY

(71) Applicant: Google Inc, Mountain View, CA (US)

(72) Inventors: Sascha Benjamin Brawer, Bern (CH); Andrew Lookingbill, Palo Alto, CA (US); Brian Edmond Brewington, Fort Collins, CO (US); Michael Edward Goss, Boulder, CO (US)

(73) Assignee: Google Inc., Mountain View, CA (US)

( * ) Notice: Subject to any disclaimer, the term of this patent is extended or adjusted under 35 U.S.C. 154(b) by 293 days.

(21) Appl. No.: 13/741,328

(22) Filed: Jan. 14, 2013

(65) Prior Publication Data

US 2015/0170415 A1 Jun. 18, 2015

Related U.S. Application Data

(60) Provisional application No. 61/715,233, filed on Oct. 17, 2012.

(51) Int. Cl.
*G06T 15/00* (2011.01)
*G06T 17/10* (2006.01)

(52) U.S. Cl.
CPC ..................................... *G06T 17/10* (2013.01)

(58) Field of Classification Search
None
See application file for complete search history.

(56) References Cited

U.S. PATENT DOCUMENTS

| 5,630,043 | A | * | 5/1997 | Uhlin | 345/474 |
| 2013/0207972 | A1 | * | 8/2013 | Wu | 345/420 |
| 2013/0225197 | A1 | * | 8/2013 | McGregor et al. | 455/456.1 |

OTHER PUBLICATIONS

Horna et al., "Building 3D Indoor Scenes Topology from 2D Architectural Plans", Mar. 2007, GRAPP (GM/R) (pp. 37-44).*
Furukawa, et al., "Reconstructing Building Interiors from Images", In Proceedings of the International Conference on Computer Vision (ICCV), 2009, pp. 1-8, available at <http://grail.cs.washington.edu/projects/interior>.

* cited by examiner

*Primary Examiner* — Kee M Tung
*Assistant Examiner* — Frank Chen
(74) *Attorney, Agent, or Firm* — Dority & Manning, P.A.

(57) ABSTRACT

The disclosed subject matter relates to computer implemented methods for generating an exterior geometry of a building based on a corresponding collection of interior geometry. In one aspect, a method includes receiving a collection of interior geometry data of a building. The interior geometry data of the building corresponds to one or more levels. Each of the level(s) is associated with a corresponding vertical span, and to one or more 2-D section polygons. The method further includes extruding the 2-D section polygons into 2.5-D section polygons, by assigning to each of the 2-D section polygons, the vertical span associated with the level(s) to which the 2-D section polygons correspond. The method further includes constructing a 2.5-D merged polygon set based on the extruded 2.5-D section polygons. The outer shell of the 2.5-D merged polygon set corresponds to an exterior geometry corresponding to the building.

20 Claims, 9 Drawing Sheets

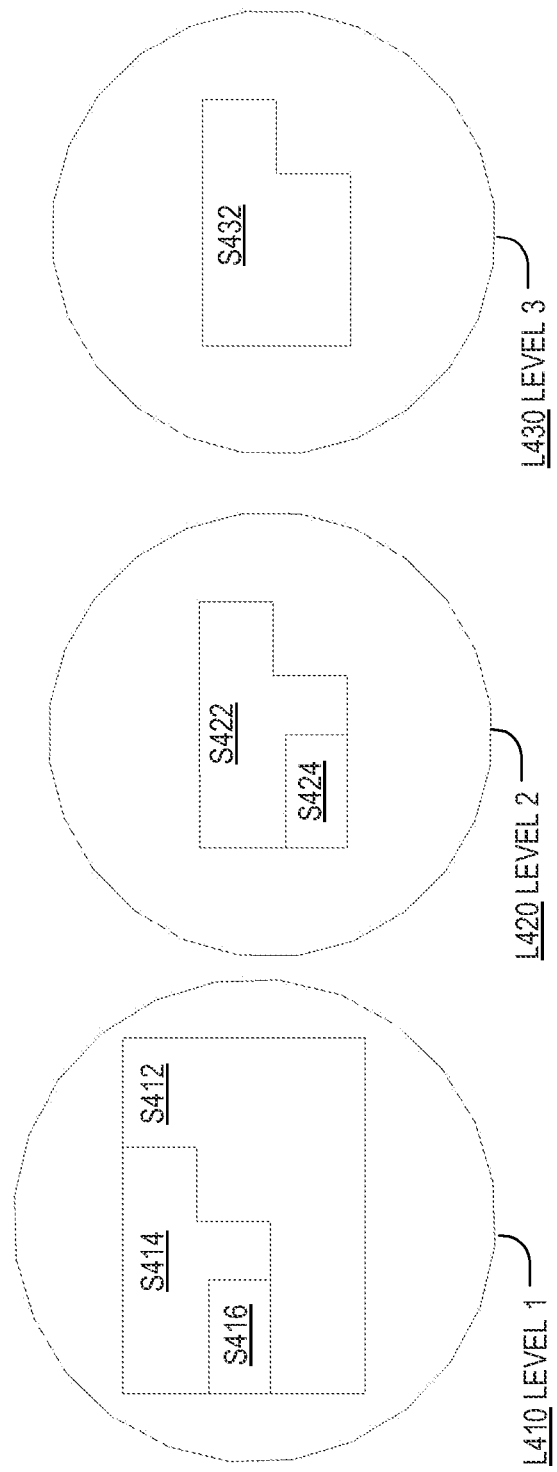

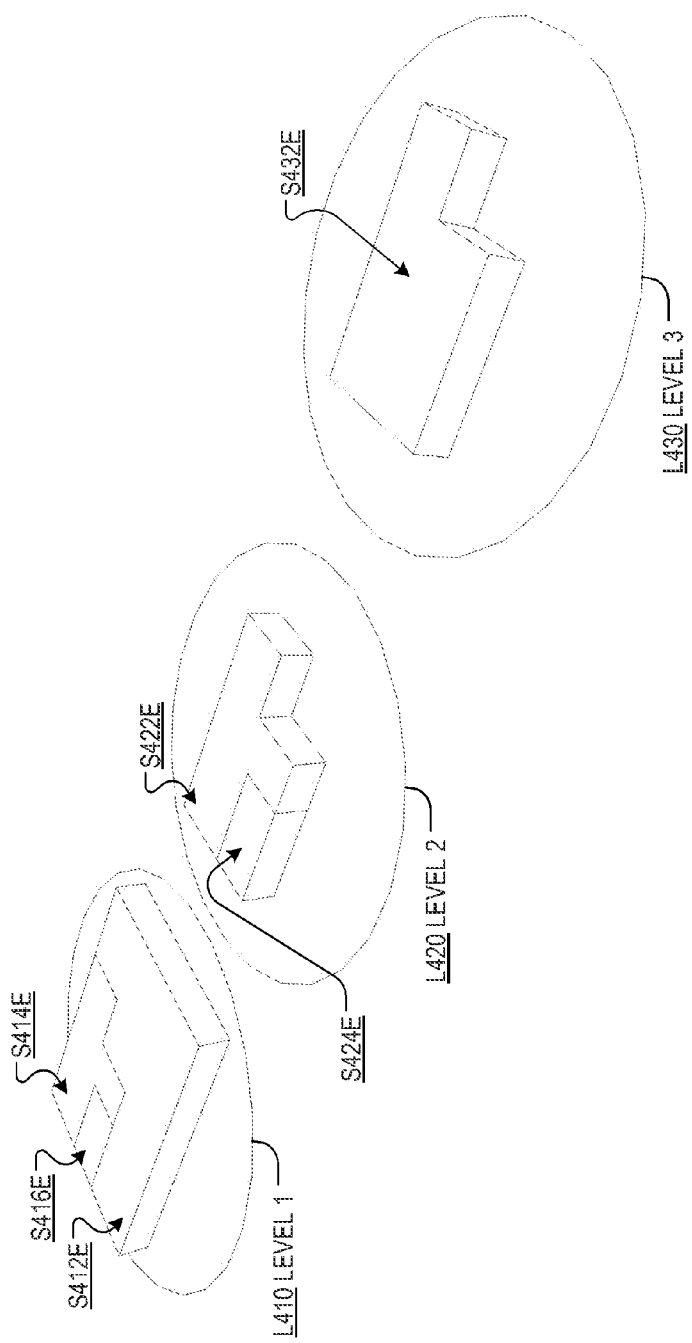

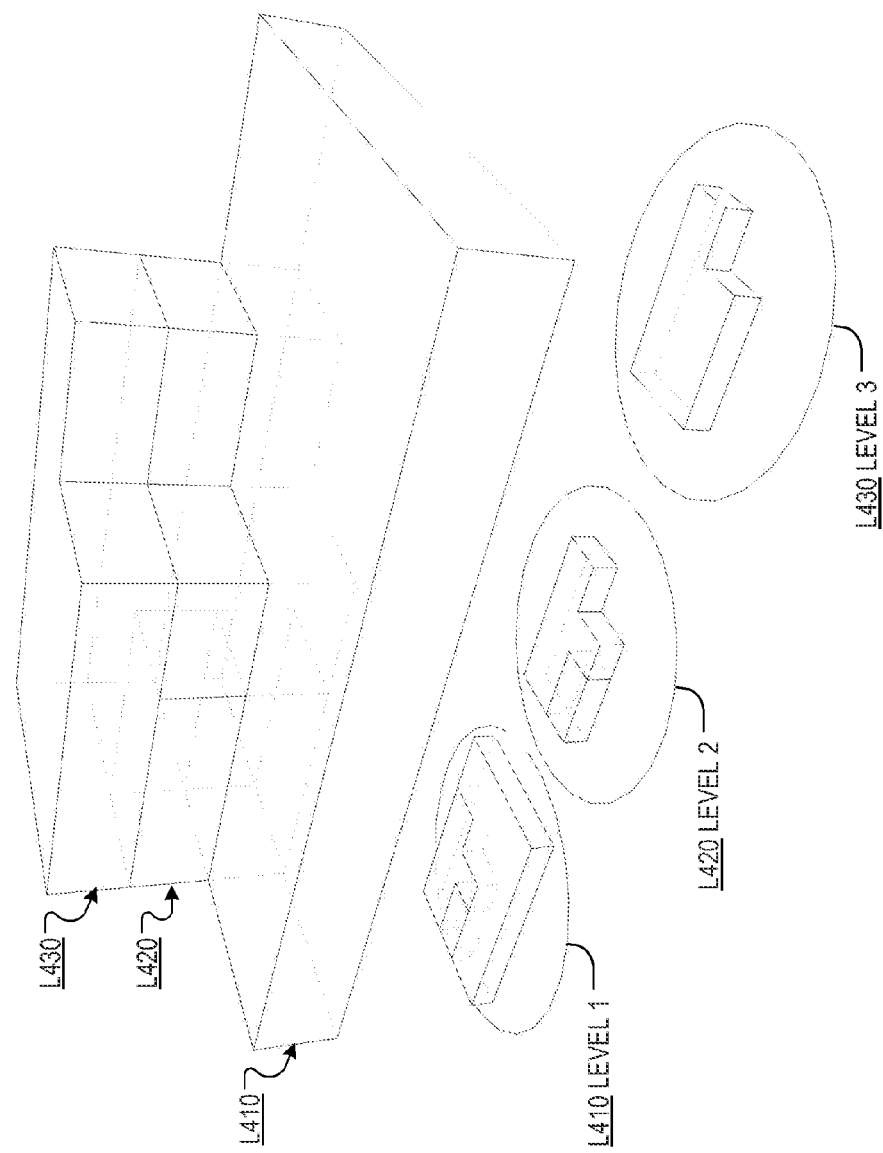

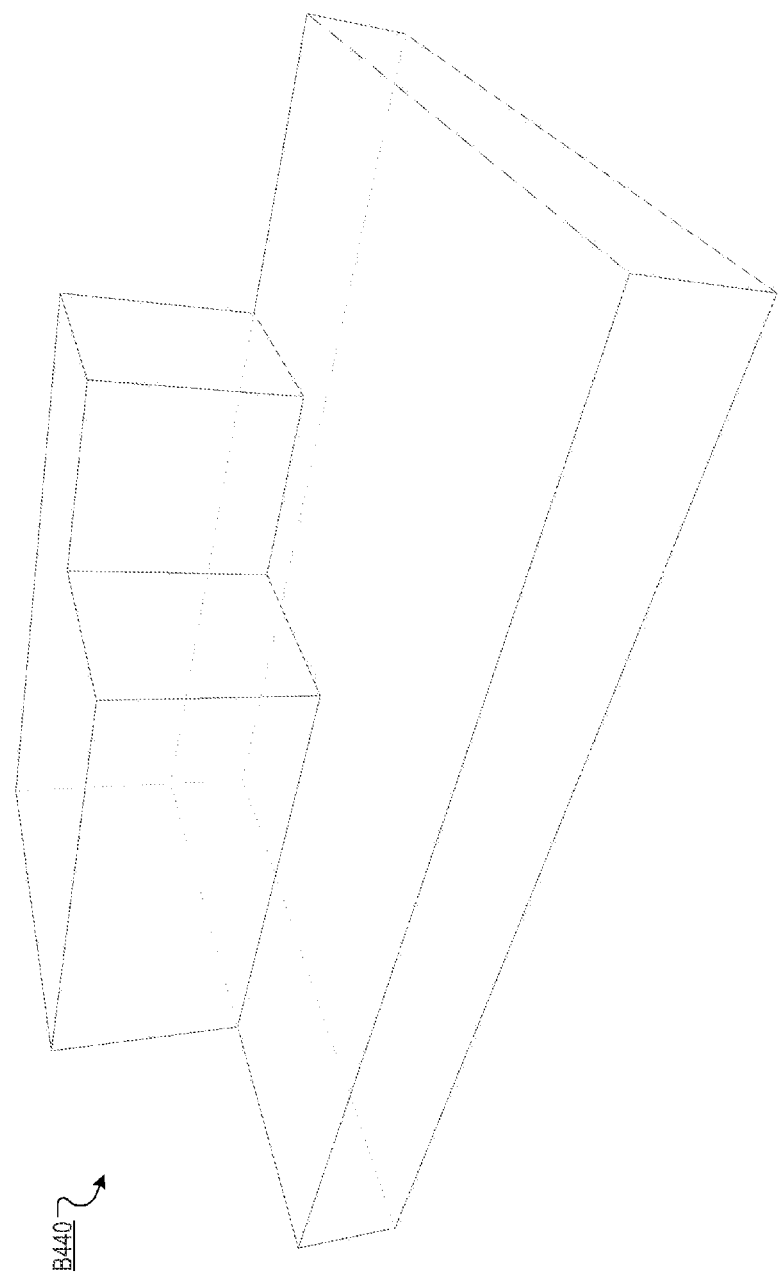

GENERATING AN EXTERIOR GEOMETRY OF A BUILDING BASED ON A CORRESPONDING COLLECTION OF INTERIOR GEOMETRY

CROSS-REFERENCES TO RELATED APPLICATIONS

The present application claims the benefit of U.S. Provisional Patent Application Ser. No. 61/715,233, titled "Generating an Exterior Geometry of a Building Based on a Corresponding Collection of Interior Geometry," filed on Oct. 17, 2012, which is hereby incorporated by reference in its entirety for all purposes.

BACKGROUND

The subject technology generally relates to building geometry, and in particular relates to generating a geometry of a building.

The internal layout of buildings is often illustrated using floor plans. Floor plans can be two-dimensional top views that can illustrate the relationship of various portions of a floor. When a building has multiple floors, a floor plan for each floor is typically used to illustrate the layout of each floor.

SUMMARY

The disclosed subject matter relates to a computer-implemented method for generating an exterior geometry of a building based on a corresponding collection of interior geometry. The method includes receiving a collection of interior geometry data of a building. The interior geometry data of the building corresponds to one or more levels. Each of the level(s) is associated with a corresponding vertical span, and to one or more 2-D section polygons. The method further includes extruding the 2-D section polygons into 2.5-D section polygons, by assigning to each of the 2-D section polygons, the vertical span associated with the level(s) to which the 2-D section polygons correspond. The method further includes constructing a 2.5-D merged polygon set based on the extruded 2.5-D section polygons. The outer shell of the 2.5-D merged polygon set corresponds to an exterior geometry corresponding to the building.

The disclosed subject matter further relates to a system for generating an exterior geometry of a building based on a corresponding collection of interior geometry. The system includes a memory which includes instructions for generating an exterior geometry of a building based on a corresponding collection of interior geometry, and a processor. The processor is configured to execute the instructions to receive a collection of interior geometry data of a building. The interior geometry data of the building corresponds to one or more levels. Each of the level(s) is associated with a corresponding vertical span, and to one or more 2-D section polygons. The processor is further configured to extrude the 2-D section polygons into 2.5-D section polygons. The extrusion includes assignment to each of the 2-D section polygons, the vertical span associated with the level(s) to which the 2-D section polygons correspond. The processor is further configured to construct, a 2.5-D merged polygon set, based on the 2.5-D section polygons. To construct the 2.5-D merged polygon set, the processor is configured to stack the 2.5-D section polygon(s), merge two or more of the stacked 2.5-D section polygons, and simplify the two or more merged stacked 2.5-D section polygons. The outer shell of the 2.5-D merged polygon set corresponds to an exterior geometry corresponding to the building.

The disclosed subject matter further relates to a machine-readable storage medium including machine-readable instructions for causing a processor to execute a method for generating an exterior geometry of a building based on a corresponding collection of interior geometry. The method includes receiving a collection of interior geometry data of a building. The interior geometry of the building corresponds to one or more levels. Each of the level(s) is associated with a corresponding vertical span, and to one or more 2-D section polygons. The method further includes extruding the 2-D section polygons into 2.5-D section polygons, by assigning to each of the 2-D section polygons, the vertical span associated with the level(s) to which the 2-D section polygons correspond. The method includes constructing, a 2.5-D merged polygon set based on the extruded 2.5-D section polygons. The construction of the 2.5-D merged polygon set includes stacking the 2.5-D section polygon(s), merging at least two of the stacked 2.5-D section polygons, and simplifying two or more merged 2.5-D section polygons. The outer shell of the 2.5-D merged polygon set corresponds to an exterior geometry corresponding to the building.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

FIGS. 4A-4E illustrate an example of the process of FIG. 3.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In some instances, it may be desirable to match the interior geometry of the building with the exterior geometry of the building. Currently, one method of ensuring a match between the interior model and the exterior model of a building, is to take internal measurements of the building, and then manipulate either or both the interior and exterior models based on the measurements. Not only is this approach challenging and tedious, the results that it produces can often be visually unappealing.

According to certain aspects of the subject technology, systems and methods for creating an exterior geometry of a building based on a corresponding collection of interior geometry are provided.

The subject technology involves receiving a collection of interior geometry data of a building. The interior geometry data of the building can include one or more levels that correspond to 2-D section polygons. The term level as used herein encompasses its plain and ordinary meaning, including, but not limited to a logical grouping based upon a height with respect to the ground. The 2-D section polygons can be grouped by level. The 2-D section polygons are extruded into 2.5-D section polygons. The term 2.5-D (e.g., with respect to polygons) as used herein encompasses its plain and ordinary meaning, including, but not limited to a prism shape. The 2.5-D section polygons are stacked or re-stacked. The stacked 2.5-D section polygons are then merged or simplified. An outer shell of the 2.5-D merged or simplified polygons corresponds to an exterior geometry corresponding to the building. Thus, an exterior geometry of the building is generated based upon a corresponding collection of interior geometry.

Figure 1:
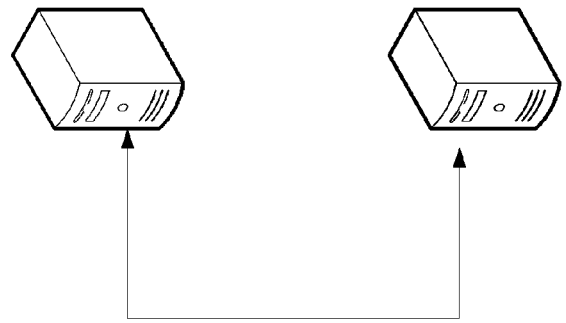
FIG. 1 illustrates an example of an architecture for generating an exterior geometry of a building based on a corresponding collection of interior geometry.
Figure 1:
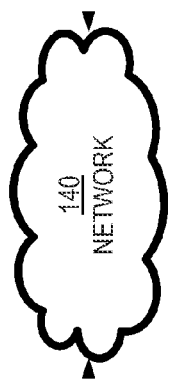
Figure 1:
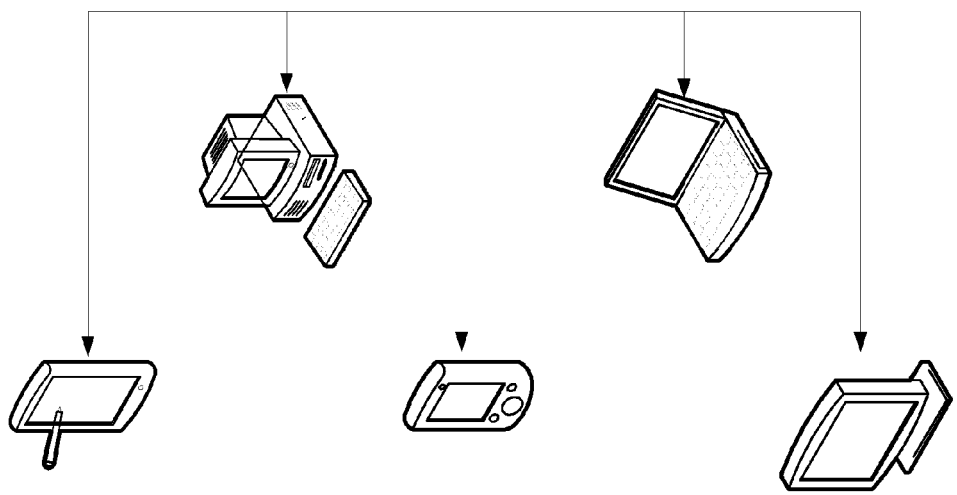

FIG. 1 illustrates an example of an architecture 100 for generating an exterior geometry of a building based on a corresponding collection of interior geometry. The architecture 100 includes client computing devices 110 and servers 170 connected over a network 140.

The client computing devices 110 can be, for example, mobile computers, tablet computers, mobile devices (e.g., a smartphone or PDA), desktop computers, set top boxes (e.g., for a television), video game consoles, or any other devices having appropriate processing capabilities, communications capabilities, and memory.

The client computing devices 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

The client computing device 110 includes an input device 202, an output device 204, a processor 220, a communications module 222, and memory 240. The input device 202 can be a touchscreen, a mouse, a keyboard, an audio input device (e.g., a microphone), a video input device (e.g., a camera, a motion detector), or any other device to enable a user to supply input 206 to the client computing device 110. The output device 204 can be a display screen. Input 206 received via the input device 202 can be processed locally on the client computing device 110 and/or the server 170.

The client computing device 110 is connected to the network 140 via a communications module 222. The communications module 222 is configured to interface with the network 140 to send and receive information, such as data, requests, responses, and commands to other devices on the network 140. The communications module 222 can be, for example, a modem or Ethernet card.

The memory 240 includes a graphical user interface 250 which can be used by a user to interact with the computing device 110 and/or the server 170, and can be used to display information, for example building geometry, to the user. The graphical user interface 250 may be installed locally at the computing device 110 and/or downloaded from the server 170. The memory 240 further includes software instructions 242 that can be read by the processor 220 to enable interaction with the server 170. For example, the software instructions 242 can include an operating system or an application (e.g., a web browser) that can be processed by the processor 220. Data generated or stored at the client computing device 110 can be stored as data 244.

The server 170 includes a memory 280, a processor 260, and a communications module 262. The memory 280 includes software instructions that can be read by the processor 260 to implement a geometry module 282 for generating an exterior geometry of a building based on a corresponding collection of interior geometry. The geometry module 282 receives a collection of interior geometry data 284 of a building. The interior geometry data 284 of the building corresponds to one or more levels. Each of the level(s) is associated with a corresponding vertical span, and to one or more 2-D section polygons. The geometry module 282 extrudes the 2-D section polygons into 2.5-D section polygons, by assigning to each of the 2-D section polygons, the vertical span associated with the level(s) to which the 2-D section polygons correspond. The geometry module 282 constructs a 2.5-D merged polygon set based on the extruded 2.5-D section polygons. The outer shell of the 2.5-D merged polygon set corresponds to an exterior geometry corresponding to the building.

The term "vertical span" as used herein encompasses its plain and ordinary meaning, including, but not limited to a vertical position of a level. The vertical span of a level may be defined relative to another level, or a ground level. The vertical span may be expressed as a height above or below a relative level. The vertical span may be expressed as a difference between a first vertical height and a second vertical height, where the first vertical height and the second vertical height are defined relative to another level, or a ground level.

In addition to a vertical span, each of the levels may further have a corresponding order value which indicates a logical relative location of each of the levels with respect to other levels in the building.

Each of the 2-D section polygons are defined by one or more sets of latitudinal and longitudinal coordinates. Furthermore, each of the 2-D section polygons is generated based on a floor plan of the building.

The server 170 is connected to the network 140 via a communications module 262. The communications module 262 is configured to interface with the network 140 to send and receive information, such as data, requests, responses, and commands to other devices on the network 140. The communications module 262 can be, for example, a modem or Ethernet card.

The processor 260 of the server 170 is configured to execute instructions, such as instructions physically coded into the processor 260, instructions received from the memory 280, or a combination of both. As an example, the processor 260 of the server 170 executes instructions for generating an exterior geometry of a building based on a corresponding collection of interior geometry.

Once the instructions from the memory 280 are loaded, the processor 260 is configured to receive a collection of interior geometry data 284 of a building. The interior geometry data 284 of the building corresponds to one or more levels. Each of the level(s) is associated with a corresponding vertical span, and to one or more 2-D section polygons. The processor 260 is further configured to extrude the 2-D section polygons into 2.5-D section polygons. The extrusion includes assignment to each of the 2-D section polygons, the vertical span associated with the level(s) to which the 2-D section polygons correspond. The processor 260 is further configured to construct, a 2.5-D merged polygon set, based on the 2.5-D section polygons. To construct the 2.5-D merged polygon set, the processor 260 is configured to stack the 2.5-D section polygon(s), merge two or more of the stacked 2.5-D section polygons, and simplify the two or more merged stacked 2.5-D section polygons. The outer shell of the 2.5-D merged polygon set corresponds to an exterior geometry corresponding to the building.

Figure 2:
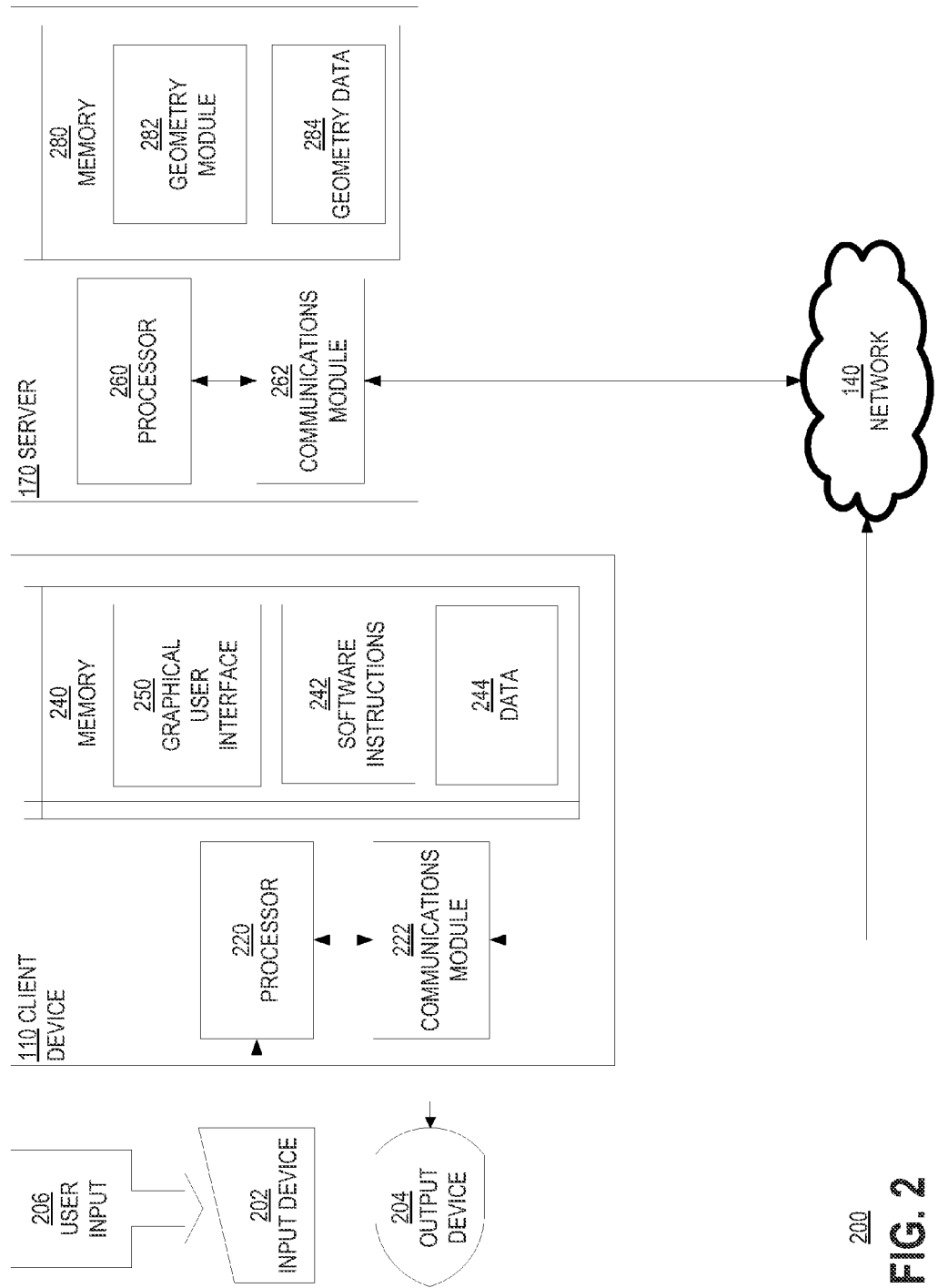
FIG. 2 is a block diagram illustrating an example of a client computing device and a server from the architecture of FIG. 1.
Figure 3:
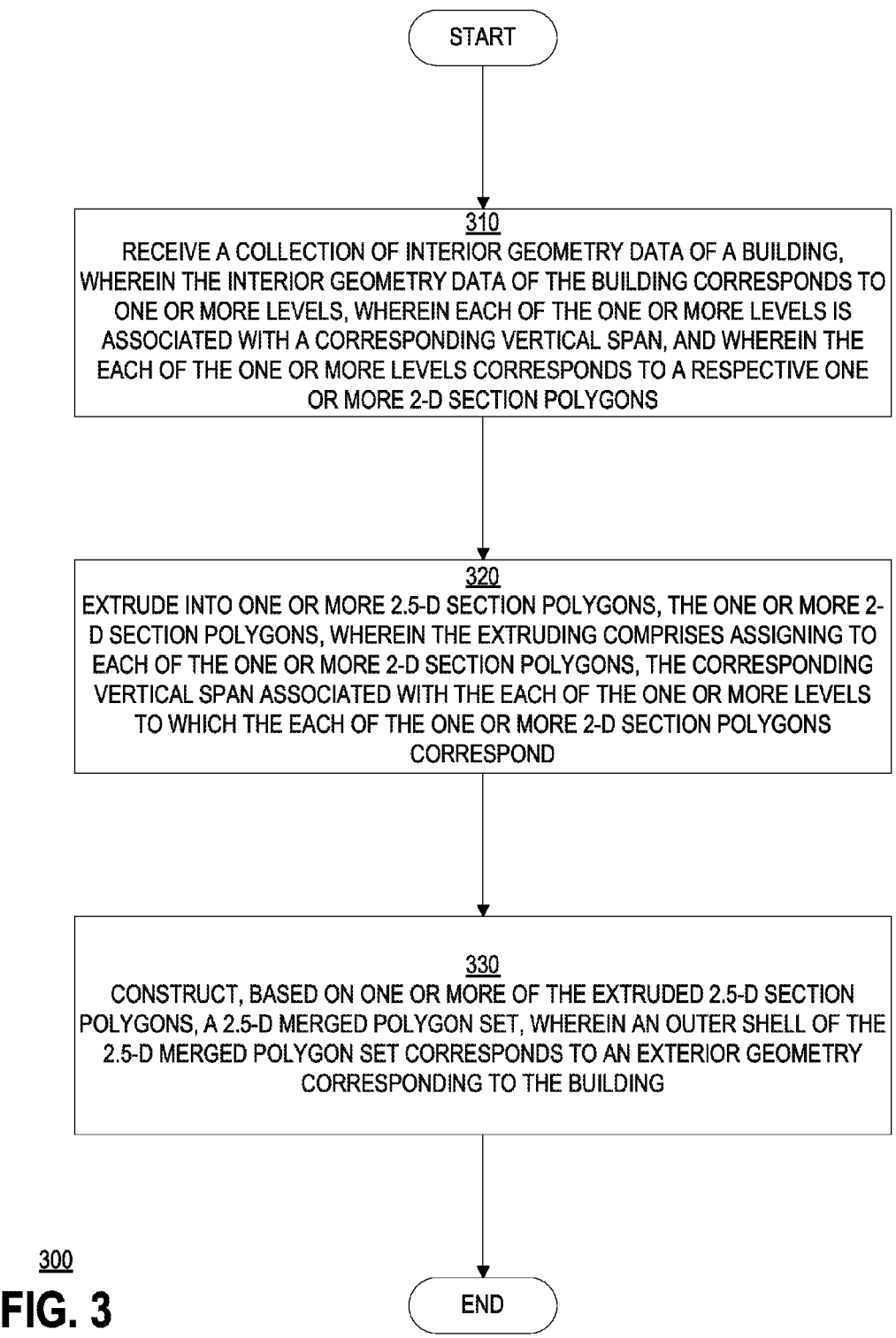
FIG. 3 illustrates an example of a process for generating an exterior geometry of a building based on a corresponding collection of interior geometry.

FIG. 3 illustrates an example of a process 300 for generating an exterior geometry of a building based on a corresponding collection of interior geometry testing a touch-based input device 202 of a computing device 110. It should be noted that although process 300 is described herein with reference to the systems of FIGS. 1 and 2, process 300 is not limited to such, and can be performed by other systems and/or configurations.

In step 310, the geometry module 282 receives a collection of interior geometry data 284 of a building. The interior geometry data 284 of the building corresponds to one or more levels. Each of the level(s) is associated with a corresponding vertical span, and to one or more 2-D section polygons.

In step 320, the geometry module 282 extrudes the 2-D section polygons into 2.5-D section polygons. The geometry module 282 performs this extrusion by, among other things, assigning to each of the 2-D section polygons, the vertical span associated with the level(s) to which the 2-D section polygons correspond.

In step 330, the geometry module 282 constructs a 2.5-D merged polygon set based on the extruded 2.5-D section polygons. The outer shell of the 2.5-D merged polygon set corresponds to an exterior geometry corresponding to the building.

An example will now be described with reference to FIGS. 4A-4E using the example of the process 300 of FIG. 3.

In step 310, the geometry module 282 receives a collection of interior geometry data 284 of a building. The geometry data 284 includes sections S412, S414, and S416 which contain references to a first level L410, sections S422 and S424 which contain references to a second level L420, and section S432 which contains references to a third level L430. Each of the sections (S412-S432) contains two-dimensional geometry of the various areas within the building.

Each of the levels L410, L420, and L430 correspond to their respective 2-D section polygons. The levels may also include references to the building. Each of the levels are associated with their corresponding vertical spans.

As illustrated in FIG. 4A, in this example the geometric data 284 was grouped by level for a particular building. However, if the geometry data 284 were not grouped in such a manner, the geometry module 282 can, at the outset of step 310, group the received geometry data 284 into logical groups, for example, by building, and by level.

In step 320, the geometry module 282 extrudes the 2-D section polygons into corresponding 2.5-D section polygons. 2.5-D section polygons may be thought of as similar to prism shapes. In one aspect, a prism can be a shape with a cross section that is the same all along at least one dimension (e.g., length, width, height). To extrude a 2-D section polygon, the geometry module 282 assigns to each of the 2-D section polygons, the vertical span associated with the level(s) to which the 2-D section polygons correspond.

In this example, the geometry module 282 assigns the vertical span of the first level L410 to sections S412, S414, and S416. The assignment of this vertical span, results in the 2.5-D sections S412E, S414E, and S416E, respectively. In similar fashion, the geometry module 282 extrudes the 2-D sections S422, S424, and S432 into 2.5-D sections S422E, S424E, and S432E, respectively. These 2.5-D section polygons (S412E-S432E) are illustrated in FIG. 4B.

In step 330, the geometry module 282 constructs a 2.5-D merged polygon set based on the extruded 2.5-D section polygons.

As illustrated in FIG. 4C, the geometry module 282 stacks the 2.5-D section polygons by levels. In this example, the geometry module 282 stacks the 2.5-D sections based on the vertical spans of their corresponding levels. If the levels have a corresponding order value, that order value can be used in addition to, or in place of the vertical span to stack the 2.5-D sections polygons.

Figure 4D:
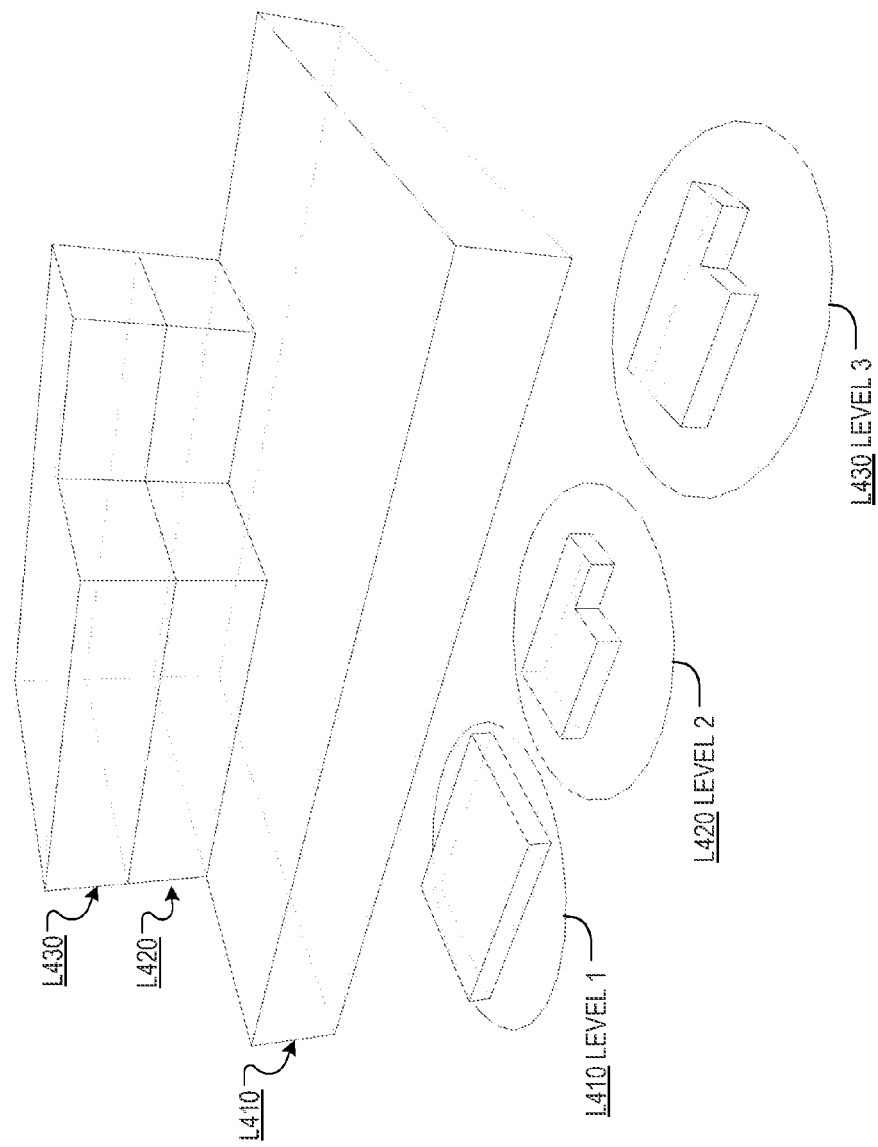

As illustrated in FIG. 4D, the geometry module 282 merges the 2.5-D section polygons within each of the levels. For example, the geometry module 282 merges the stacked 2.5-D section polygons based on their respective vertical extent. In the example of FIG. 4D, the geometry module 282 merges S412E, S414E, and S416E based on their vertical extents, each of which correspond to the first level L410. Similarly, the geometry module 282 merges S422E and S424E based on their vertical extents, each of which corresponds to the second level L420. In this example, S432E is the only 2.5-D section polygon that corresponds to the third level L430, and therefore is not merged with any other 2.5-D section polygons at this stage. In one aspect, this merging may be considered a merging within a level, or an intra-level merging.

As illustrated in FIG. 4E, the geometry module 282 merges the stacked 2.5-D section polygons based on their Z ranges. In one aspect, this merging may be considered a merging across levels, or an inter-level merging.

It should be noted that while in this example, the merging was illustrated at two different stages, illustrated in FIGS. 4D and 4E, the merging may not have such distinct stages. That is, within a single stage, two 2.5-D section polygons which are logically situated horizontally or vertically with respect to each other, may be merged. In this aspect, the merging may be considered a merging based on a footprint of the respective 2.5-D section polygons. The term footprint as used herein encompasses its plain and ordinary meaning, including, but not limited to an area corresponding to two or more 2.5-D section polygons which overlap with respect to a particular point of view, or are adjacent.

Furthermore, it should be noted that merging of the 2.5-D section polygons, or reducing the complexity of the geometry, may also be referred to as simplification of the 2.5-D section polygons.

The outer shell B440 of the 2.5-D merged polygon set corresponds to an exterior geometry corresponding to the building. This outer shell B440, or exterior geometry, may be used to update or replace an existing geometry of the building.

Figure 5:
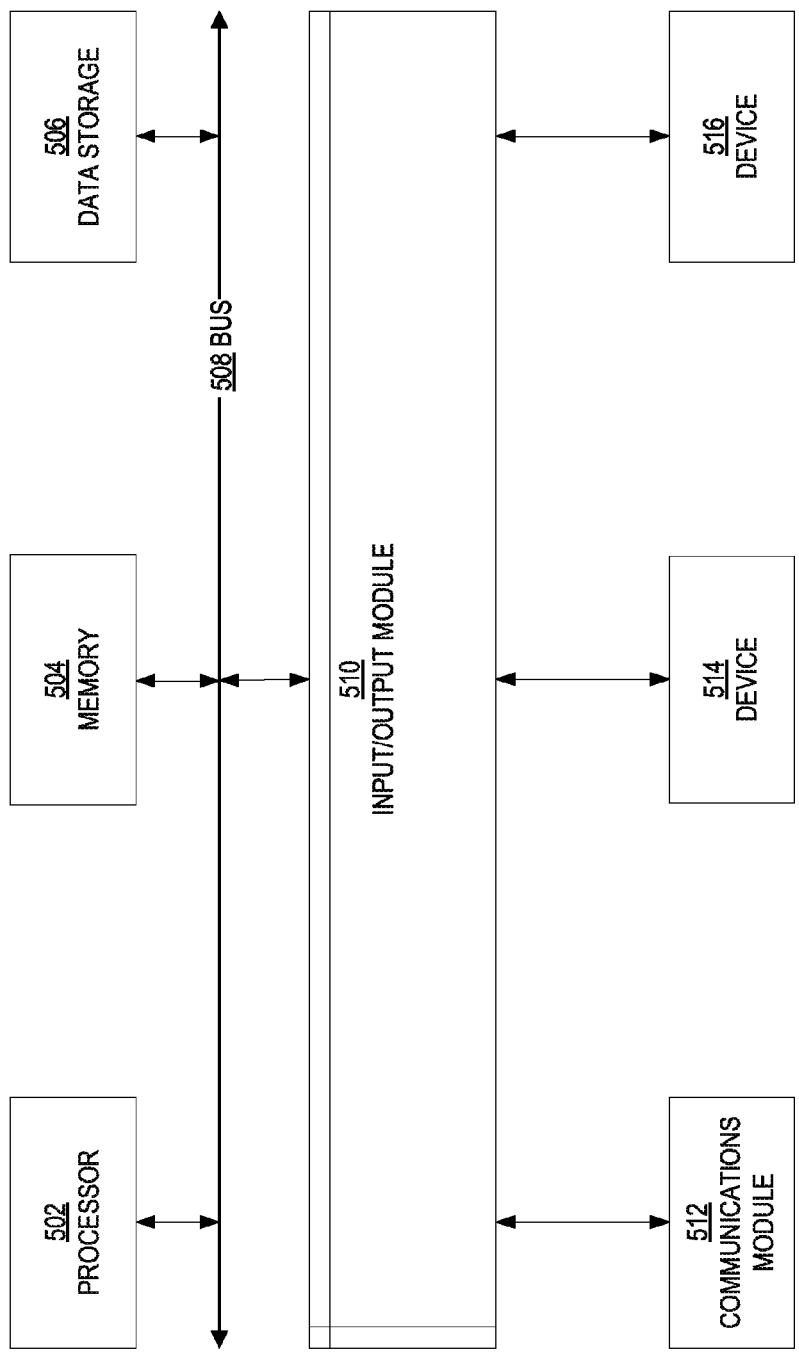
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the client computing device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client computing device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, offside rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk, optical disk, or solid state disk coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the client computing device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include client computing devices and servers. A client computing device and server are generally remote from each other and typically interact through a communication network. The relationship of client computing device and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for generating an exterior geometry of a building based on a corresponding collection of interior geometry, the method comprising:

receiving, by one or more computing devices, a collection of interior geometry data of a building, wherein the interior geometry data of the building corresponds to at least two levels, and wherein each of the at least two levels corresponds to a respective one or more 2-D section polygons;

identifying, by the one or more computing devices, a vertical span for each of the at least two levels, each vertical span specifying a first vertical height and a second vertical height, the first and second vertical heights corresponding to a vertical position of the corresponding level of the building;

subsequent to identifying the vertical span for each of the least two levels, extruding into one or more 2.5-D section polygons, by the one or more computing devices, the one or more 2-D section polygons, wherein the extruding comprises assigning to each of the one or more 2-D section polygons, the corresponding vertical span associated with each of the at least two levels to which each of the one or more 2-D section polygons correspond; and constructing, by the one or more computing devices, based on one or more of the extruded 2.5-D section polygons, a 2.5-D merged polygon set, wherein an outer shell of the 2.5-D merged polygon set corresponds to an exterior geometry corresponding to the building, the constructing comprising stacking the one or more of the 2.5-D section polygons based at least in part on the vertical spans of the at least two levels, such that the 2.5-D section polygons are stacked in accordance with the first vertical height and the second vertical height associated with the vertical spans of the corresponding levels.

2. The computer-implemented method of claim 1, wherein the collection of interior geometry data of the building is grouped logically based on a grouping algorithm.

3. The computer-implemented method of claim 1, further comprising:
grouping the one or more 2-D section polygons based on the corresponding one of the at least two levels.

4. The computer-implemented method of claim 1, wherein the constructing the 2.5-D merged polygon set comprises:
stacking the one or more of the 2.5-D section polygons;
merging at least two stacked 2.5-D section polygons; and
simplifying the merged at least two stacked 2.5-D section polygons.

5. The computer-implemented method of claim 4, wherein the merging of the at least two stacked 2.5-D section polygons is based on a Z range of each of the at least two stacked 2.5-D section polygons.

6. The computer-implemented method of claim 4, wherein the merging of the at least two stacked 2.5-D section polygons is based on a footprint of each of the at least two stacked 2.5-D section polygons.

7. The computer-implemented method of claim 4, wherein the stacking of the one or more of the 2.5-D section polygons is based on an order value, wherein the order value indicates a logical location of each one of the at least two levels, relative to each other.

8. The computer-implemented method of claim 1, wherein each of the at least two levels is a logical grouping of a portion of the collection of interior geometry data, wherein the logical grouping is based on a height with respect to a ground level.

9. The computer-implemented method of claim 1, wherein each of the one or more 2-D section polygons is defined by one or more sets of latitudinal and longitudinal coordinates.

10. The computer-implemented method of claim 1, wherein the one or more 2-D section polygons are generated based on a floor plan of the building.

11. The computer-implemented method of claim 1, further comprising:
updating an existing geometry of the building using the exterior geometry corresponding to the building.

12. A system for generating an exterior geometry of a building based on a corresponding collection of interior geometry, the system comprising:
a memory comprising instructions for generating an exterior geometry of a building based on a corresponding collection of interior geometry; and
a processor configured to execute the instructions to:
receive a collection of interior geometry data of a building, wherein the interior geometry data of the building corresponds to at least two levels, and wherein the each of the at least two levels corresponds to a respective one or more 2-D section polygons;
identifying a vertical span for each of the at least in levels, each vertical span specifying a difference between a first vertical height and a second vertical height, the first and second vertical heights corresponding to a vertical position of the corresponding level of the buildng;
subsequent to identifying the vertical span for each of the least two levels, extrude into one or more 2.5-D section polygons, the one or more 2-D section polygons, wherein the extrusion comprises assignment to each of the one or more 2-D section polygons, of the corresponding vertical span associated with the each of the at least two levels to which the each of the one or more 2-D section polygons correspond; and
construct, based on one or more of the extruded 2.5-D section polygons, a 2.5-D merged polygon set, wherein an outer shell of the 2.5-D merged polygon set corresponds to an exterior geometry corresponding to the building, and wherein the construction of the 2.5-D merged polygon set comprises stacking of the one or more of the 2.5-D section polygons based at least in part on the vertical spans of the at least two levels, merging of at least two stacked 2.5-D section polygons, and simplification of the merged at least two stacked 2.5-D section polygons, wherein the 2.5-D section polygons are stacked in accordance with first vertical height and the second vertical height associated with the vertical spans of the corresponding levels.

13. The system of claim 12, wherein the processor is further configured to execute the instructions to:
group the one or more 2-D section polygons based on the corresponding one of the at least two levels.

14. The system of claim 12, wherein the merging of the at least two stacked 2.5-D section polygons is based on a Z range of each of the at least two stacked 2.5-D section polygons.

15. The system of claim 12, wherein the merging of the at least two stacked 2.5-D section polygons is based on a footprint of each of the at least two stacked 2.5-D section polygons.

16. The system of claim 12, wherein the stacking of the one or more of the 2.5-D section polygons is based on an order value, wherein the order value indicates a logical location of each one of the at least two levels, relative to each other.

17. The system of claim 12, wherein each of the one or more 2-D section polygons is defined by one or more sets of latitudinal and longitudinal coordinates, and wherein the one or more 2-D section polygons are generated based on a floor plan of the building.

18. The system of claim 12, wherein the processor is further configured to execute the instructions to:
update an existing geometry of the building using the exterior geometry corresponding to the building.

19. One or more tangible, non-transitory computer-readable media storing computer-readable instructions that when executed by one or more processing devices cause the one or more processing devices to perform operations, the operations comprising:
receiving a collection of interior geometry data of a building, wherein the interior geometry data of the building corresponds to at least two levels, and wherein the each of the at least two levels corresponds to a respective one or more 2-D section polygons;
identifying a vertical span for each of the at least two levels, each vertical span specifying a first vertical height and a second vertical height, the first and second vertical heights corresponding to a vertical position of the corresponding level of the building;
subsequent to identifying the vertical span for each of the least two levels, extruding into one or more 2.5-D section polygons, the one or more 2-D section polygons, wherein the extruding comprises assigning to each of the one or more 2-D section polygons, the corresponding vertical span associated with the each of the at least two levels to which the each of the one or more 2-D section polygons correspond; and
constructing, based on one or more of the extruded 2.5-D section polygons, a 2.5-D merged polygon set, wherein an outer shell of the 2.5-D merged polygon set corresponds to an exterior geometry corresponding to the building, and wherein the constructing the 2.5-D merged polygon set comprises stacking the one or more of the 2.5-D section polygons based at least in part on the height of the corresponding levels above or below at least one other level, merging at least two stacked 2.5-D section polygons, and simplifying the merged at least two stacked 2.5-D section polygons wherein the 2.5-D section polygons are stacked in accordance with the first vertical height and the second vertical height associated with the vertical spans of the corresponding levels.

20. The one more tangible, non-transitory computer-readable media of claim 19, wherein the method further comprises:
    updating an existing geometry of the building using the exterior geometry corresponding to the building.

* * * * *